US012570053B2

(12) United States Patent
Moini et al.

(10) Patent No.: US 12,570,053 B2
(45) Date of Patent: Mar. 10, 2026

(54) MULTI-MATERIAL CONCRETE 3D PRINTING WITH THERMOPLASTIC AND ELASTOMERIC POLYMERS

(71) Applicant: The Trustees of Princeton University, Princeton, NJ (US)

(72) Inventors: Reza Moini, Princeton, NJ (US); William Makinen, Alexandria, VA (US)

(73) Assignee: The Trustees of Princeton University, Princeton, NJ (US)

( * ) Notice: Subject to any disclaimer, the term of this patent is extended or adjusted under 35 U.S.C. 154(b) by 210 days.

(21) Appl. No.: 18/122,432

(22) Filed: Mar. 16, 2023

(65) Prior Publication Data

US 2023/0294363 A1 Sep. 21, 2023

Related U.S. Application Data

(60) Provisional application No. 63/320,327, filed on Mar. 16, 2022.

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ............................ B29C 64/209; B29C 64/336
See application file for complete search history.

(56) References Cited

U.S. PATENT DOCUMENTS

2015/0137401 A1* 5/2015 Comb ................... B29C 64/209
483/1
2018/0326660 A1* 11/2018 Gifford ................. B29C 64/241
(Continued)

FOREIGN PATENT DOCUMENTS

EP 3616865 A1 * 3/2020 ........... B29C 64/336
WO WO-2022124982 A1 * 6/2022 ............. B28B 1/001

OTHER PUBLICATIONS

Translation of EP-3616865-A1 (Year: 2020).*

*Primary Examiner* — John J DeRusso
(74) *Attorney, Agent, or Firm* — Meagher Emanuel Laks Goldberg & Liao, LLP

(57) ABSTRACT

Methods and devices for additive production of multi-materials are provided. Various devices may include a plurality of toolheads, each toolhead operably coupled to a different composition and having a kinematic coupling mechanism. The compositions may include a first composition comprising a cement paste or mortar, and a second composition comprising a thermoplastic polymer and/or an elastomeric polymer. The devices may include a moveable tool mount configured to be removably coupled to the kinematic coupling mechanism of each toolhead. A processor may be included that is configured to cause the deposition of the first composition and cause the deposition of the second composition simultaneous with the first composition and/or deposit the second composition after the first composition is deposited. Systems and techniques for toolpath creation may also be provided. In-situ structures may be provided that may include cement paste in contact with a thermoplastic polymer or an elastomeric polymer.

5 Claims, 4 Drawing Sheets

(51) Int. Cl.

| | |
|---|---|
| *B29C 64/209* | (2017.01) |
| *B29C 64/336* | (2017.01) |
| *B29K 101/12* | (2006.01) |
| *B33Y 10/00* | (2015.01) |
| *B33Y 30/00* | (2015.01) |
| *B33Y 50/02* | (2015.01) |
| *B33Y 80/00* | (2015.01) |
| *B29K 509/00* | (2006.01) |

(52) U.S. Cl.

CPC ............ *B29C 64/336* (2017.08); *B33Y 10/00* (2014.12); *B33Y 30/00* (2014.12); *B33Y 50/02* (2014.12); *B33Y 80/00* (2014.12); *B29K 2101/12* (2013.01); *B29K 2509/00* (2013.01)

(56) References Cited

U.S. PATENT DOCUMENTS

| | | | | |
|---|---|---|---|---|
| 2020/0114481 | A1* | 4/2020 | Steeb ..................... | B23Q 1/015 |
| 2021/0114303 | A1* | 4/2021 | Cook .................. | B28B 23/0062 |
| 2021/0394441 | A1* | 12/2021 | Rzadkowski .......... | B33Y 10/00 |
| 2021/0402692 | A1* | 12/2021 | Fetfatsidis .............. | B22F 12/90 |
| 2023/0339138 | A1* | 10/2023 | Na ........................ | B28B 11/048 |

* cited by examiner

MULTI-MATERIAL CONCRETE 3D PRINTING WITH THERMOPLASTIC AND ELASTOMERIC POLYMERS

CROSS-REFERENCE TO RELATED APPLICATIONS

This application claims priority to U.S. Provisional Patent Application No. 63/320,327, filed Mar. 16, 2022.

TECHNICAL FIELD

The present disclosure is 3D printing, and specifically to 3D printing of concrete.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Concrete 3D printing (C3DP) or additive manufacturing (AM) has seen an emerging interest in recent years given its potential to evolve the construction industry due to its ability to remove the geometric constraints of traditional manufacturing techniques while still being able achieve similar or improved mechanical properties compared to cast counterparts. Nevertheless, there are few fabrication pathways for achieving reinforcements or for enabling the opportunities to control the spatial and local composition and morphology of multiple material assemblies. Most research in C3DP has focused on engineering single-material systems that does not deal with multiple materials.

BRIEF SUMMARY

Various deficiencies in the prior art are addressed below by the disclosed compositions of matter and techniques.

In various aspects, a device for additive production of multi-materials may be provided. The device may include a plurality of toolheads, where each toolhead may be operably coupled to a different composition. The different compositions may include a first composition comprising a cement paste or mortar, and a second composition comprising a thermoplastic polymer and/or an elastomeric polymer. Each toolhead may have a kinematic coupling mechanism. The device may include a moveable tool mount that may be configured to be removably coupled to the kinematic coupling mechanism of each toolhead. The device may include a processor configured to perform certain steps. The steps may include depositing the first composition, and may include depositing the second composition simultaneously with the first composition and/or deposit the second composition after the first composition is deposited.

The process may be further configured to automatically decouple from a first toolhead after depositing the first composition and couple to a second toolhead before depositing the second composition. The processor may be further configured to provide at least one different processing parameter when, or for use in depositing the first composition than when depositing the second composition, the at least one different processing parameter being a speed, a flow rate, a temperature, or a combination thereof. The processor may be further configured to adjust processing parameters to control melting of the thermoplastic polymer.

In various aspects, a method for in-situ 3D-printing of polymer reinforcement may be provided. The method may include depositing a first composition (e.g., a cement paste or mortar), and may include depositing a second composition (e.g., a thermoplastic polymer and/or an elastomeric polymer) simultaneously with the first composition and/or before the first composition is deposited.

In some embodiments, (i) the first composition and (ii) the second composition and/or a third composition are deposited simultaneously through a coaxial extrusion toolhead. In some embodiments, the second composition may include a thermoplastic polymer, and the third composition may include an elastomeric polymer. In some embodiments, (i) the first composition and (ii) the second composition and/or a third composition are deposited at different stages and spatial locations of a final printed object using different toolheads. The method may include having a tool mount automatically switch between toolheads to print a desired object.

The method may include adjusting processing parameters to control melting and of the thermoplastic polymer. The method may include determining at least one processing parameter (e.g., a speed, a flow rate, a temperature, or a combination thereof) necessary for each composition to be deposited. In some embodiments, the first composition may be deposited onto a support material.

In various aspects, a method for co-toolpath planning is provided. The method may include receiving first information that is representative of a desired object comprising a plurality of materials. The materials may include (i) a cement paste, and (ii) a thermoplastic polymer, an elastomeric polymer, or both. The method may include determining a target path for depositing based on properties of the cement paste, thermoplastic polymer, and/or elastomeric polymer, and geometries and offsets of different material toolheads. The method may include outputting the target path into a computer numerical control (CNC) programming language.

The first information may be received from, e.g., a computer-aided design program or file. In some embodiments, receiving first information may include receiving user input describing a desired object.

In various aspects, a system for co-toolpath planning may be provided. The system may include at least one processor and a non-transitory computer-readable medium containing instructions that, when executed by the at least one processor, cause the at least one processor to perform certain steps. The steps may include receiving first information that is representative of a desired object comprising a plurality of materials. The materials may include (i) a cement paste, and (ii) a thermoplastic polymer, an elastomeric polymer, or both. The steps may include determining a target path for depositing based on properties of the cement paste, thermoplastic polymer, and/or elastomeric polymer, and geometries and offsets of different material toolheads. The steps may include outputting the target path into a computer numerical control (CNC) programming language.

In some embodiments, an in-situ 3D printed structure may be provided. The in-situ 3D printed structure may include a first portion comprising cement paste, and may include a second portion in contact with the first portion, the second portion comprising a thermoplastic polymer and/or an elastomeric polymer. The first portion and second portion may form, e.g., an interlaced lamellar structure.

BRIEF DESCRIPTION OF DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Disclosed herein are techniques for 3D printing multi-materials.

A device for additive production of multi-materials may be provided.

Figure 1:
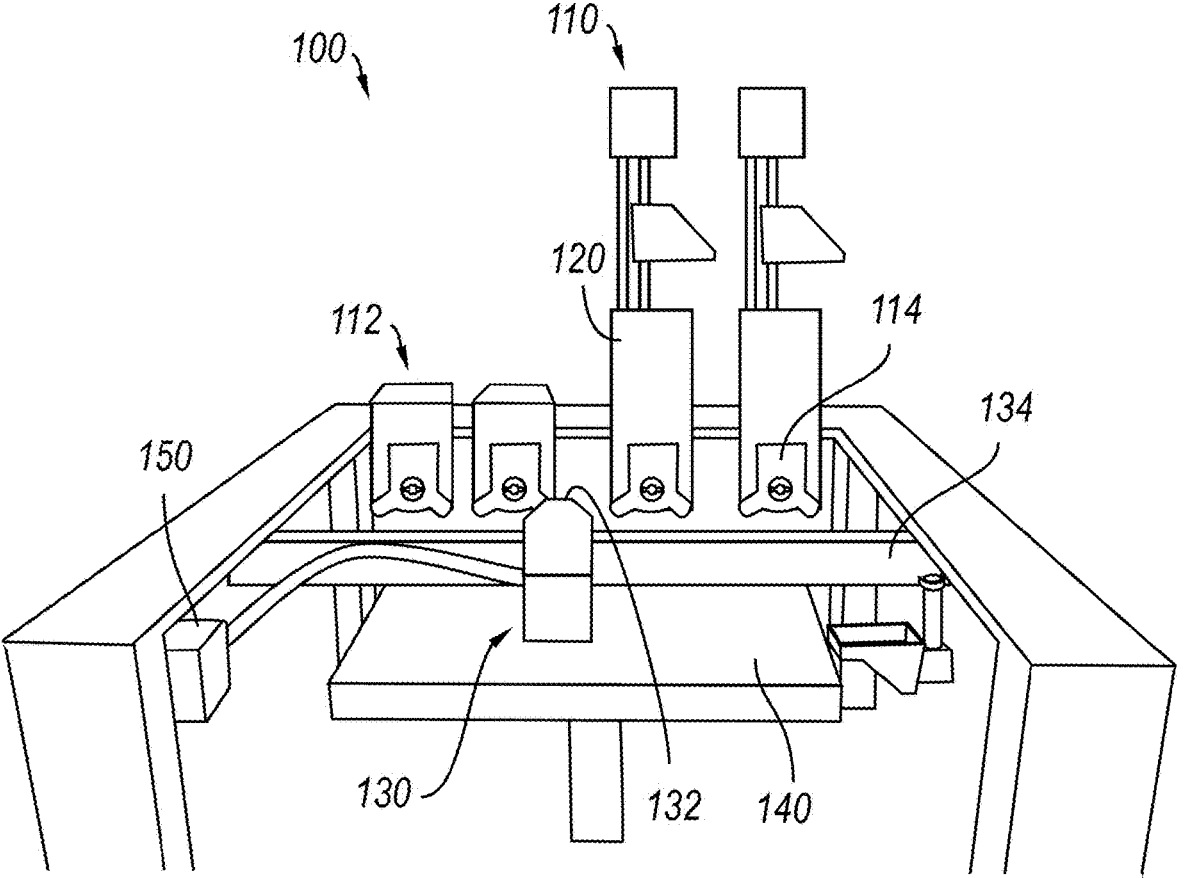
FIG. 1 is an illustration of a device for additive production of multi-materials.

Referring to FIG. 1, the device 100 may include a plurality of toolheads 110, 112. Each toolhead may be operably coupled to a different composition. For example, in some instances, a reservoir 120 containing a material may be directly connected to the toolhead.

While multiple compositions may be incorporated, at least one composition should be a cement paste or mortar, and at least one composition should include a thermoplastic polymer and/or an elastomeric polymer.

As used herein, the term "cement paste" includes cement and water. "Mortar" includes cement, water, and sand. In a cement paste or mortar, the hydration reaction has commenced upon mixing, but it has not completed. In some embodiments, cement paste will have a water to cement ratio in the range from about 2.5:10 to about 4.5:10 by mass, and more typically in the range of 3:10 to about 3.5:10 for 3D-printing.

As used herein, the term "thermoplastic polymer" refers to a polymeric material that will melt upon exposure to sufficient heat to form a flowable liquid and will return to a solidified state upon sufficient cooling. In their solidified state, such thermoplastic polymers exhibit either crystalline or semicrystalline morphology. Suitable thermoplastic polymers include, but are not limited to, polyolefins (e.g., polyethylenes, polypropylenes, polybutylenes, and any combinations thereof), polyamides (e.g., nylon), polyurethanes, polyesters (e.g., polyethylene terephthalate), and the like, as well as any combinations thereof. These thermoplastic polymers can be in the form of powder, fluff, flake, or pellet, and may be made from, e.g., freshly-produced polymer, polymer regrind, post-consumer waste, etc. Commonly, they are used as prepared 'filaments' for 3D-printing.

As used herein, the term "elastomeric polymer" refers to a polymer capable of recovering its original size and shape after deformation. In other words, an elastomeric polymer is a polymer having elastic or viscoelastic properties. Elastomeric polymers may also be referred to as "elastomers" in the art. Elastomeric polymers include, without limitation, homopolymers (polymers having a single chemical unit repeated) and copolymers (polymers having two or more chemical units).

In some embodiments, the elastomer may be a silicone elastomer. As used herein, the term "silicone" refers to a polysiloxane. As used herein, the term "silicone elastomer" refers to a rubber comprised of silicone. In its uncured state, silicone elastomers are a highly-adhesive gel or liquid. In order to convert to a solid, it must be cured, vulcanized or catalyzed. Silicone elastomers may include silicone polymers that are or can be cross-linked, in the presence of, e.g., moisture. Appropriate catalysts are well understood in the art.

Each toolhead 110, 112 may have a kinematic coupling mechanism 114.

The device may include at least one moveable tool mount 130 that may have a surface 132 facing the kinematic coupling mechanism(s). The moveable tool mount(s) may be configured to be removably coupled to at least one kinematic coupling mechanism (e.g., surface 132 may interface with the kinematic coupling mechanism). The tool mount may be configured to move side-to-side over a build area 140, e.g., along a mounting bar 134. The mounting bar may be configured to move front-to-back. In some embodiments, this may allow a mounted toolhead to have access to the entire build area.

The device may include a processor (e.g., at least one processor) configured to perform certain steps. The processor (not shown) may be on a circuit board within a protecting housing 150. The processor may include additional circuitry.

As it used herein, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASK), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of equipment. A processor can also be implemented as a combination of computing processing units.

As used herein, processors may be coupled to various other components via circuitry, including, e.g., a memory, a non-transitory (or nonvolatile) computer-readable storage device(s), an input and/or output device (such as a display). As used herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

Figure 2:
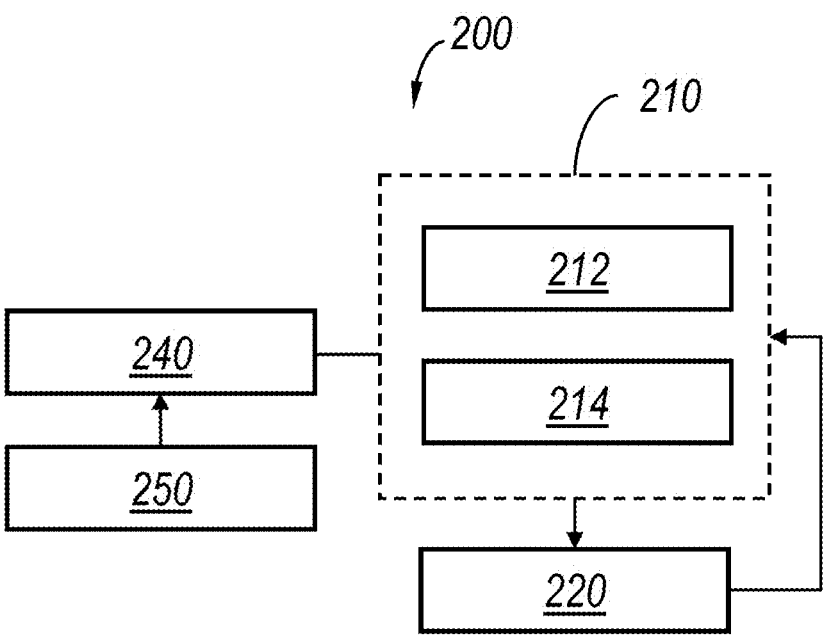
FIG. 2 is a flowchart of a method for in-situ 3D-printing of polymer reinforcement.

The steps the processor(s) follow may include a method for in-situ 3D-printing of polymer reinforcement. This method may be seen with respect to FIG. 2. In FIG. 2, it is shown that the method 200 may include depositing 210 the various compositions. This may include depositing 212 a first composition (e.g., a cement paste). This may also include depositing 214 a second composition (e.g., a thermoplastic polymer and/or an elastomeric polymer) either (i) simultaneously with the first composition, and/or (ii) before the first composition is deposited.

The depositing step may include depositing multiple compositions through a coaxial extrusion toolhead. For example, in some embodiments, (i) the first composition and (ii) the second composition and/or a third composition are deposited simultaneously through a coaxial extrusion toolhead. In some embodiments, the second composition may include a first polymer (such as a thermoplastic polymer), and the third composition may include a second polymer (such as an elastomeric polymer, or a different thermoplastic polymer).

The depositing step may include depositing different compositions at different stages and spatial locations of a final printed object using different toolheads. For example, in some embodiments, (i) the first composition and (ii) the second composition and/or a third composition are deposited at different stages and spatial locations of a final printed object using different toolheads.

If compositions are printed at different times, the method may include automatically selecting 220 a toolhead to print a desired object based on the material that is required to be deposited.

As noted previously, a water to cement ratio can be described for the cement paste or mortar. In some embodiments, one composition may include a first water-to-cement ratio, and another composition may include a second water-to-cement ratio that is different from the first water-to-cement ratio.

The method may include adjusting 240 processing parameters (e.g., a speed, a flow rate, a temperature, or a combination thereof) to control melting of the thermoplastic polymer and/or adjusting the processing parameters to control degree of cross-linking of the elastomeric polymer.

The method may include determining 250 at least one processing parameter (e.g., a speed, a flow rate, a temperature, or a combination thereof) necessary for each composition to be deposited. This may be done prior to depositing any compositions. This may be done while compositions are being deposited. In some embodiments, data from a sensor (not shown) may be used to adjust a parameter. For example, if a temperature sensor indicates a first material that was deposited is at a first temperature, the processor(s) may determine a correct set of processing parameters in order to deposit a second material adjacent to the first material based on that detected temperature, in order to achieve a desired set of properties for the second material.

In some embodiments, the first composition may be deposited onto a support material. As used herein, the term "support material" refers to any material (e.g., a sacrificial material) that serves as a temporary support (e.g., a mechanical support) for the active material being 3D printed, during the 3D printing process.

It will be understood that to control the device, for 3D printing, toolpath planning may be required, e.g., to generate a target toolpath for the device to use for printing these multi-materials.

Figure 3:
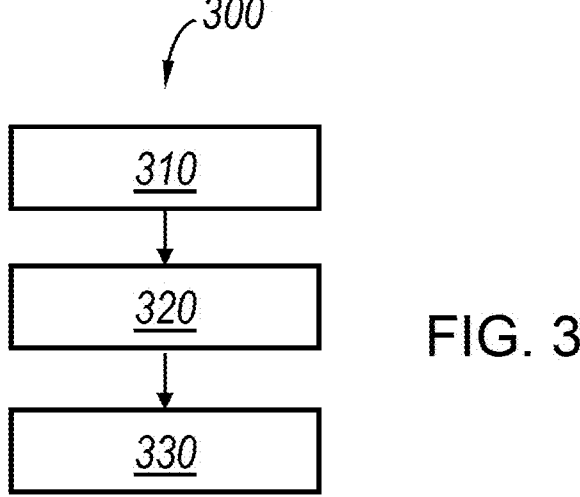
FIG. 3 is a flowchart of a method for co-toolpath planning.

As such, in various aspects, a method for co-toolpath planning may be provided. Referring to FIG. 3, the method 300 may include receiving 310 first information that is representative of a desired object comprising a plurality of materials. The materials, as disclosed herein, may include (i) a cement paste, and (ii) a thermoplastic polymer, an elastomeric polymer, or both. The desired object may be any object comprised of those materials.

The first information may be received from, e.g., a computer-aided design program or file. For example, in some embodiments, this may include receiving a file in the widely used stereolithography (STL) file format created by 3D Systems, but any other appropriate format is acceptable.

In some embodiments, receiving first information may include receiving user input describing a desired object. For example, in some embodiments, a user may input information about dimensions of an object, and may select or provide information about the compositions to be deposited and the manner in which they should be deposited.

The method may include determining 320 a target path for depositing the various materials based on properties of the cement paste, thermoplastic polymer, and/or elastomeric polymer, and geometries and offsets of different material toolheads. The target path may be referred to as a toolpath. The term "toolpath" refers to a road-like path traveled by a computer-controlled tool such as the moveable tool mount (when removably attached to a toolhead) as disclosed herein to fashion the printable compositions into a three-dimensional object or portion of a three-dimensional object.

The method may include outputting 330 the target path into a computer numerical control (CNC) programming language, such as gcode or other known language.

Figure 4:
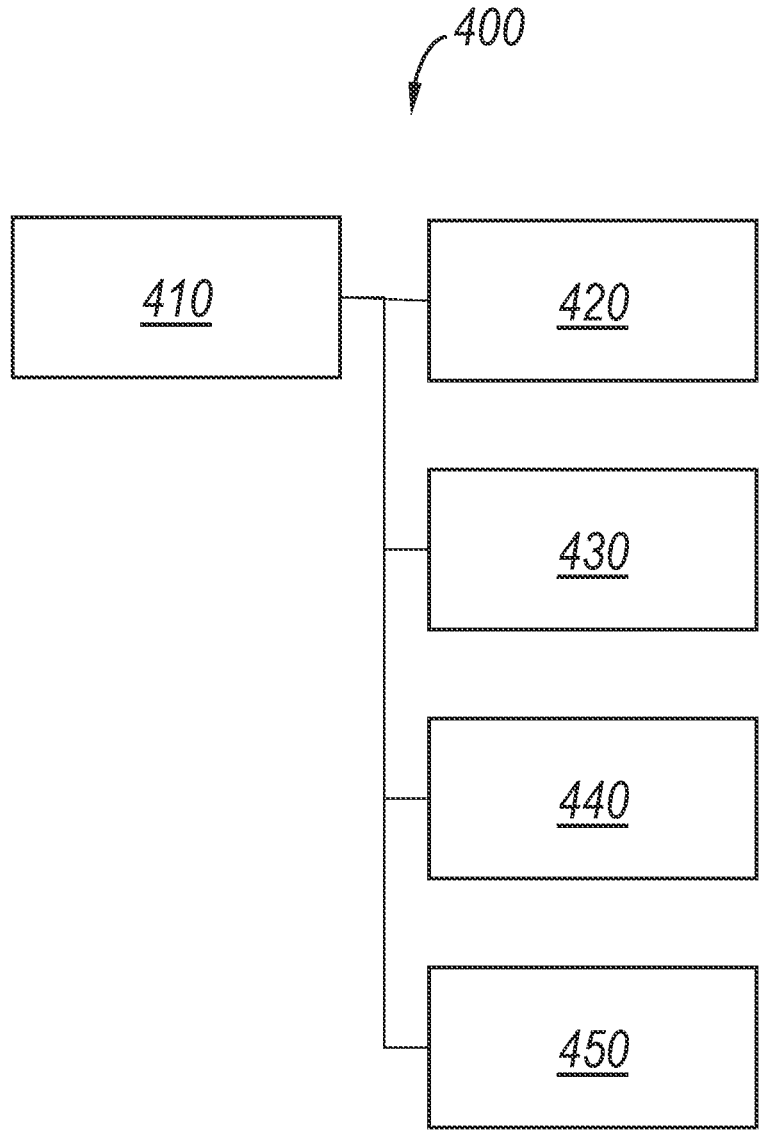
FIG. 4 is a block diagram of a system, e.g., for co-toolpath planning.

In various aspects, a system for co-toolpath planning may be provided. Referring to FIG. 4, the system 400 may include at least one processor 410. The processor(s) may be operably coupled to various components, such as a memory 420, a non-transitory computer-readable storage medium 430, a wired or wireless transceiver 440, and a display 450.

The non-transitory computer-readable medium may contain instruction that, when executed by the processor(s), cause the processor(s) to perform certain steps. For co-toolpath planning, the steps will include those steps described herein with regards to FIG. 3.

Figure 5A:
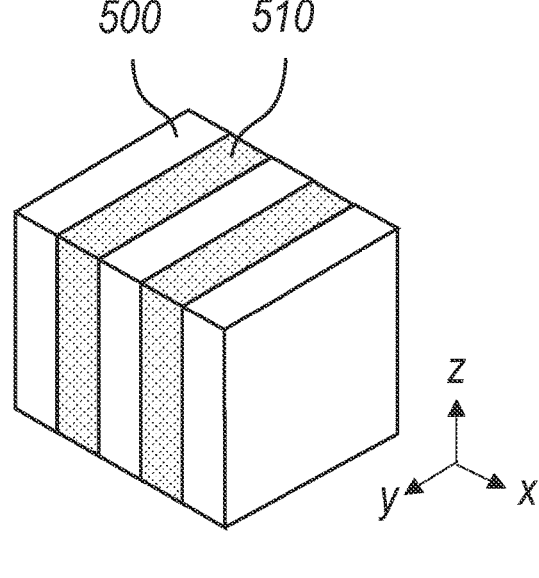
FIGS. 5A-5D are illustrations of 3D printed structures.
Figure 5B:
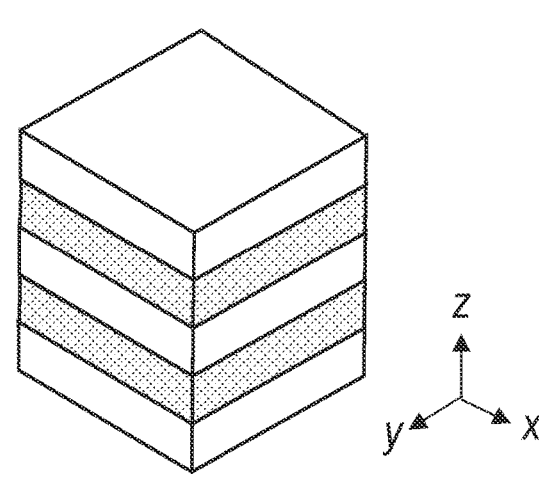
Figure 5C:
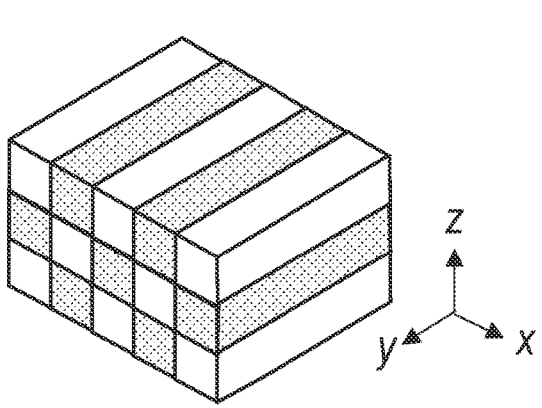
Figure 5D:
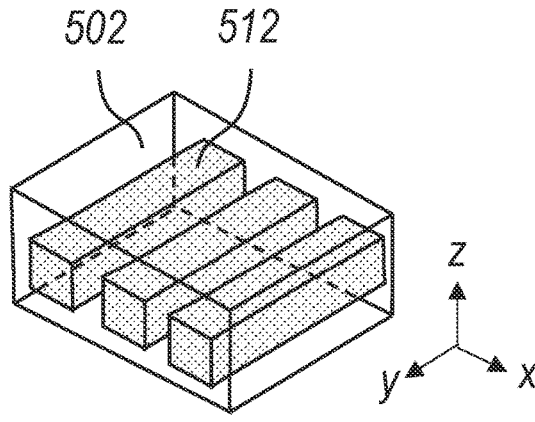

The disclosed devices and techniques allow for the various 3D structures to be printed. Referring to FIGS. 5A-5D, these in-situ 3D printed structure may include a first portion 500 comprising cement paste, and may include a second portion 510 in contact with the first portion, the second portion comprising a thermoplastic polymer and/or an elastomeric polymer. In FIG. 5A, an interlaced structure can be seen. The different layers are deposited side-by-side; that is, each layer is generally deposited in the y-z plane, and different layers are seen as you move in the x-direction as seen in FIG. 5A. If FIG. 5B, a layered structure can be seen, where different layers are deposited on top of the layer beneath it. Said differently, each layer is generally deposited in the x-y plane, and different layers are seen as you move in the z-direction. In FIG. 5C, a combination of FIGS. 5A and 5B can be seen. That is, an interlaced-layered structure is shown, where different materials are seen as you move in both the x- and/or z-directions. In FIG. 5D, a lamellar structure is shown, where individual patterns 512 of a second material are positioned within a larger deposit 502 of a first material.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed:

1. A device for additive production of multi-materials, comprising:
   a plurality of toolheads, each toolhead operably coupled to a different composition and having a kinematic coupling mechanism, the different composition including:
      a first composition comprising a cement paste; and
      a second composition comprising a thermoplastic polymer and/or an elastomeric polymer;
   a moveable tool mount configured to be removably coupled to the kinematic coupling mechanism of each toolhead; and
   a processor configured to:
      deposit the first composition; and
      deposit the second composition simultaneous with the first composition.

2. The device according to claim 1, wherein the processor is further configured to automatically decouple from a first toolhead after depositing the first composition and couple to a second toolhead before depositing the second composition.

3. The device according to claim 1, wherein the processor is further configured to provide at least one different processing parameter when depositing the first composition than when depositing the second composition, the at least one different processing parameter being a speed, a flow rate, a temperature, or a combination thereof.

4. The device according to claim 1, wherein the processor is further configured to adjust processing parameters to control melting and solidification of the thermoplastic polymer.

5. The device according to claim 1, further comprising a coaxial extrusion toolhead configured to deposit the first composition and at least one other composition simultaneously through the coaxial extrusion toolhead.

* * * * *